Patented Feb. 10, 1931

1,791,630

UNITED STATES PATENT OFFICE

CARLTON EARLE MILLER, OF PALO ALTO, CALIFORNIA

COMPOSITION OF MATTER

No Drawing.  Application filed March 8, 1926.  Serial No. 93,320.

This invention relates generally to compositions or materials for mixing with Portland cement for the purpose of altering the properties of concrete made from the same.

It has been found that the addition of small quantities of certain alkaline salts to Portland cement will cause concrete to attain a high breaking strength within a fraction of the time which is normally required. One alkaline salt which will effect this result to a marked degree is calcium chloride. Although this salt is very cheap and produces the desired effect upon the concrete it has been found impractical for extensive use since it is normally hygroscopic to the point of deliquescence. If calcium chloride is exposed to the air for even a short time it absorbs moisture and becomes a liquid so that it must be shipped and stored in expensive moisture-proof containers. If it is allowed to deliquesce before mixing with the cement it must first be diluted with water before being mixed with the concrete. As a result the use of this material in the past has been so expensive as to make it prohibitive.

This invention has for its object the devising of a method and means for preserving calcium chloride in dry condition when exposed to the air, which will also be productive of advantageous results when incorporated in a concrete mixture. To attain this object the calcium chloride, or other normally deliquescent salt, is finely divided while in dry condition and mixed with the powdered material which is non-hygroscopic. Suitable non-hygroscopic material is diatomaceous earth which not only serves as an effective agent for keeping the calcium chloride in dry condition but also tends in combination with the calcium chloride to increase the strength of the finished concrete.

In practice calcium chloride crystals and diatomaceous earth are ground together in a revolving hammer mill or other suitable machine until reduced to a fine powder. The resulting mixture will keep indefinitely and may be shipped in ordinary sacks to the location where the cement is to be mixed. The calcium chloride in such a mixture will not deliquesce probably because the finely powdered diatomaceous earth completely surrounds each particle and thereby prevents it from absorbing moisture from the air. Diatomaceous earth of itself is non-hygroscopic so the entire mixture will tend to remain dry.

The materials do not have to be mixed together in exact proportions. Good results have been obtained by using two pounds of calcium chloride to three pounds of diatomaceous earth, five pounds of this mixture being added to every one hundred pounds of Portland cement used in the concrete. Another mixture giving good results consists of one-half pound calcium chloride to three pounds of diatomaceous earth, three pounds of the mix being employed to every one hundred pounds of Portland cement.

For convenience the dry mix may be put up in packages having a weight such that one package may be used with every sack of Portland cement to secure the desired proportions. It is introduced into the mixing machine in dry condition and thoroughly distributed throughout the Portland cement and aggregate of the concrete mix, water being then added in the usual manner to bring the mix to the desired consistency. Concrete made from Portland cement to which has been added such a mix of calcium chloride and diatomaceous earth will reach a breaking strength within about five days which is substantially equal to the breaking strength of ordinary concrete at the end of twenty-eight days or more, and will ultimately be superior in strength to ordinary concrete. This latter effect is probably caused by the diatomaceous earth which probably fills up certain of the voids in the concrete, and which acts to release its held water or calcium chloride solution, slowly to the cement mixture, resulting in a concrete mixture which has a high, early strength and a continuously increasing strength for twenty-eight days, at which time it reaches its ultimate strength, which is materially higher than that of ordinary, standard concrete. The invention makes it practical to employ calcium chloride with Portland cement as it effects a great saving in the cost of transportation and insures a dry mixture at all times.

I claim:

1. A material to be mixed with Portland cement concrete mixture, comprising a mixture of calcium chloride and diatomaceous earth.

2. A material to be mixed with Portland cement concrete mixture comprising a mixture of powdered calcium chloride and powdered diatomaceous earth.

In testimony whereof, I have hereunto set my hand.

CARLTON EARLE MILLER.